United States Patent Office 3,059,031
Patented Oct. 16, 1962

3,059,031
PROCESS FOR PREPARING PENTANONE-3
Thomas Alderson, Wilmington, Del., assignor to E. I. du Pont de Nemours and Company, Wilmington, Del., a corporation of Delaware
No Drawing. Filed Jan. 18, 1960, Ser. No. 2,840
2 Claims. (Cl. 260—597)

This invention relates to new and valuable procedures for the preparation of pentanone-3 employing group VIII noble metal halides as catalysts.

There are many known methods for preparing ketones. Among such are acylation of hydrocarbons, oxidation of secondary alcohols, catalytic dehydrogenation of secondary alcohols, ozonolysis of olefins, thermal decarboxylation of acids, interaction of anhydrides with organometallic reagents, interaction of organometallic reagents with ethers, hydrolysis of ketone derivatives, etc. Some of these methods are of laboratory interest only, and others are of limited applicability. Because of the great expansion in the industrial use of protective coatings based on cellulose derivatives which has taken place during the last few years, the demand for pentanone-3 for use as a solvent in preparing and using such compositions has increased greatly. This has stimulated interest in the discovery of a new and different route for cheaply making this important chemical from readily accessible and relatively inexpensive intermediates. This invention provides such a route.

According to the methods of this invention, pentanone-3 is produced by reacting ethylene with carbon monoxide and water at temperatures above 100° C. and pressures of at least 100 atmospheres in the presence of a catalyst composed of at least one halide of a group VIII noble metal of atomic number 44 to 78.

To practice this invention, one employs as essential reactants a mixture of water, carbon monoxide, and ethylene. This mixture consists of ethylene, carbon monoxide and water in such proportions that the

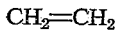

and CO under the process conditions of this invention react in a 2:1 mole ratio. At least sufficient water is present in the reactant mixture to provide 1 mole of hydrogen per mole of ethylene.

In other words the quantities of respective starting materials used is always sufficient to produce pentanone-3, as schematically shown below:

(1)
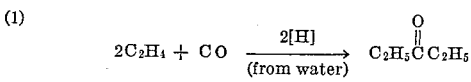

Thus, the water is used in amounts sufficient to provide at least 1 mole of hydrogen per mole of ethylene. There is no critical upper limit on the amount of $H_2O$ which can be present. In fact the water can be used as a preferred reaction medium in which to effect contact between the ethylene and carbon monoxide in the presence of the group VIII noble metal halide catalyst.

Broadly, there is no critical or necessary relationship between respective quantities of $CH_2=CH_2$ and CO which must be present in the initial charge to the reactor to make the processes of the present invention operative.

However, a practical and preferred way for attaining the theoretical mole ratios of ethylene and carbon monoxide necessary for obtaining pentanone-3, according to this invention, is by using a mixture of ethylene and carbon monoxide in 1:1 mole ratio. Alternatively, the $CH_2=CH_2$ or CO can be charged individually or separately into the reactor, and an initial excess of one or the other of these reactants (with respect to the other) can be charged to the reaction. Any unreacted ethylene or carbon monoxide is vented to the atmosphere at the end of the reaction.

The essential catalyst used in the processes of this invention comprises at least one halide of a group VIII noble metal of an atomic number 44 to 78. By the term "halide" is meant to include the chlorides, bromides, and iodides. The group VIII noble metals of atomic numbers 44 to 78 are ruthenium, rhodium, palladium, osmium, iridium and platinum. Examples of halides of such noble metal include ruthenium dichloride, ruthenium tetrachloride, ruthenium triiodide, platinum tetrachloride, platinum tetraiodide, palladium dibromide, osmium dichloride, osmium trichloride, iridium tetrachloride, iridium tetrabromide, iridum triiodide, and the like. The preferred catalysts, because of their general availability and solubility in water, are the noble metal bromides and chlorides.

The valence of the noble metal in the halide catalyst is not critical. Thus, the valence of the noble metal can be in its highest state or in a lower state. Instead of using a noble metal halide in which the noble metal is in only one state of oxidation, a mixture of one or more noble metal halides, in which the noble metal is in different valence states, can be used. Similarly, the noble metal halide need not be in an anhydrous form. In fact, the hydrated forms are preferred, particularly because they are commercially available and because the reaction is carried out in an aqueous medium.

As actually used in the processes of the invention, the group VIII noble metal halide is initially in aqueous solution. The amount of water used with the reactants, as indicated above, is sufficient to dissolve at least 0.00001 mole of at least one group VIII noble metal halide, as is desired in order to practice the present invention. Naturally, it is preferred to use halides having a finely divided physical form to permit them to go into solution rapidly, as a matter of convenience.

It has been found that the effectiveness of the noble metal halide catalyst is enhanced by including in the noble metal halide an organic derivative of a group V element of atomic number 7 to 83, in the trivalent state. Such group V elements include nitrogen, phosphorous, arsenic, antimony, and bismuth. Thus, such organic derivatives include compounds of the general formula (2)

in which M is the group V element and R, R', and R" are monovalent hydrocarbon radicals such as aryl, cycloalkyl, and alkyl radicals, preferably of 1 through 18 carbons with the proviso that when M is nitrogen, the R's can form a heterocyclic structure with such nitrogen. Examples of such compounds are tricresylphosphine, tritolylphosphine, trixylylphosphine, dimethylphenylarsine, methyldioctylarsine, dimethylethylamine, triphenylamine, dimethylcyclohexylamine, pyridine, quinoline and the like.

Preferred compounds of Formula 2 are those where the aryl group is phenyl or tolyl; the cycloalkyl group is methylcyclohexyl, cyclohexyl, cyclopentyl, or cyclobutyl; and the alkyl group is methyl, ethyl, propyl, butyl, decyl or octadecyl. A preferred heterocyclic compound is pyridine. Most preferred organic derivatives of Formula 2 are pyridine, quinoline, and triphenylphosphine.

The amount of group VIII noble metal halide catalyst used is generally at least about 0.00001 mole per mole of ethylene reactant. In general also, one will usually not employ more than 0.1 mole of group VIII halide catalyst per mole of ethylene, although the upper limit is not significant.

When the catalyst is a mixture of halides of group VIII noble metals and organic derivatives of group V elements, the amount of group VIII noble metal halides will be at least 0.00001 mole per mole of ethylene and the amount of organic derivatives of group V element will be at least 0.00001 mole per mole of ethylene. In the catalyst mixture the mole ratio of halide of group VIII noble metal to organic derivative of group V element is from about 0.2:1 to 1:1.

Preferred catalyst combinations, as indicated, are the group VIII metal chlorides and bromides with pyridine, quinoline, and triphenylphosphine.

Compounds of Formula 2 are sufficiently soluble in water that, using the indicated mole ratio of group VIII noble metal halide to the said organic derivatives, the combination is soluble in the starting water to the desired extent of at least 0.00001 mole per mole of ethylene.

The processes of the invention can, in general, be conducted in any conventional pressure apparatus.

This invention can be practiced by heating the reactants batchwise, semi-continuously, or continuously in any suitable pressure resistant vessel, e.g., an autoclave, or tubular converter preferably lined with an inert material such as glass, porcelain, silver, stainless steel, etc. In a continuous process, the reactants may be introduced at one or more points within the reaction vessel. In certain instances, it is better to employ a tubular reactor in which temperature and pressure are not uniform throughout the length of the vessel.

In the stoichiometry of the reaction of formation of pentanone-3, the ethylene and carbon monoxide appear to react in 2:1 mole ratio. In the overall reaction, however, additional carbon monoxide may be required to react with the water to give carbon dioxide and the needed hydrogen. The plausibility of the latter reaction as the source of the hydrogen in this synthesis is indicated by the identification of carbon dioxide in the bleed gases from the reactor when carbon monoxide is heated with water in the presence of say iridium trichloride trihydrate. In practice the reactor can be charged with water and then pressured with a 1:1 mole ratio of ethylene-carbon monoxide gas mixture in such amount that the internal pressure is at least 100 atmospheres, preferably at least 200 atmospheres. As a rule, there is no practical advantage in operating at pressures above 3000 atmospheres.

The reaction of ethylene, carbon monoxide, and water is conducted in the presence of the aforesaid catalysts at temperatures which are at least 100° C. Generally, there is no practical merit in using temperatures above 350° C. and this represents the practical operating temperature. Since outstanding results are realized using temperatures of 150° to 300° C., the process is most generally operated in this range.

The noble metal halides are unique catalysts for the reaction of ethylene, water, and carbon monoxide to produce pentanone-3. Thus, if the noble metal halide is replaced by a halide of a base metal of group VIII alone or in admixture with an organic derivative of a group V element, e.g., pyridine, no pentanone-3 is detected in the reaction product.

In one embodiment of this invention, a pressure reactor is charged with water and catalyst. The reactor is then cooled to 0° C. or lower, evacuated, and 1:1 mole ratio ethylene-carbon monoxide mixed gas is then injected in amount such that at 100° C. the pressure within the reactor is at least 100 atmospheres. The charge is agitated and maintained at the temperature selected for reaction with periodic addition of ethylene-carbon monoxide mixed gas to compensate for that consumed in the reaction. These conditions are maintained until there is no further pressure drop. Thereafter, the reaction mixture is allowed to cool; the reactor is opened, and the contents are discharged. The desired pentanone-3 is isolated by distillation or other means known to those skilled in the art.

The examples which follow further illustrate the unique and valuable advantages of this invention. Parts are by weight, the volume of the reactor is 400 ml., and the ethylene-carbon monoxide gas mixture employed contains the gas as in 1:1 mole ratio, unless otherwise specified.

*Example 1*

This illustrates the inoperativeness of a group VIII base metal halide as a catalyst for the reaction of ethylene, carbon monoxide, and water to produce pentanone-3.

A pressure reactor is charged with 125 parts of water and 0.91 part of nickel chloride hexahydrate. The reactor is cooled, evacuated, pressured with a 1:1 ethylene-carbon monoxide mixture, and heated at 180–200° C. and 750–1000 atm. for 10 hours. A pressure drop of 10 atm. is recorded during this period. There is recovered from the reactor 115 parts of clear, light yellow liquid; $n_D^{25}$, 1.3359 (water, $n_D^{20}$ 1.3329), which when analyzed by gas chromatography shows only one peak on an alumina-packed column at 6.5 minutes. Thus, this product is not pentanone-3, especially because distilled water shows a peak at 6.5 minutes on the same column.

*Example 2*

This example illustrates that pyridine is ineffective in activating a group VIII base metal as a catalyst for the formation of pentanone-3 from $CH_2=CH_2$, $CO$, and $H_2O$.

The above procedure is repeated using 130 parts of water, along with 0.91 part of nickel chloride hexahydrate and 1.5 parts of pyridine. Again a pressure drop of 10 atm. is observed during the reaction period. There are recovered from the reactor 127 parts of clear liquid, $n_D^{25}$, 1.3400, and approximately three parts of brown, sticky oil, $n_D^{25}$ 1.5025. The clear liquid is analyzed by gas chromatography on an alumina-packed column. A single absorption peak is observed at 6.5 minutes. Distilled water shows a single peak at 6.5 minutes when analyzed on this column. This result shows that pyridine has no effect in promoting the catalytic properties of nickel chloride in the reaction of ethylene, carbon monoxide, and water to produce pentanone-3.

*Example 3*

A pressure reactor is charged with 100 parts of water, 1.04 parts of a commerical mixture of ruthenium chlorides containing 81% $RuCl_4 \cdot H_2O$ and 19% $RuCl_3 \cdot 3H_2O$, and 1.2 parts of pyridine. The reactor is cooled, evacuated, and pressured with a 1:1 carbon monoxide-ethylene mixture. The reactants are heated at 195–220° C. under 550–650 atm. pressure for 10 hours. During this time a pressure drop of 705 atm. is observed. There is recovered from the reactor 151 parts of liquid consisting of a clear red-brown top phase and a clear colorless bottom phase. This product is distilled through a 12-inch distilling column and a total of 136 parts of distillate, boiling at 30–64° C./3 mm. pressure, and 7 parts of black residue is obtained. The distillate is washed with two times its volume of concentrated aqueous calcium chloride solution and 69 parts of organic phase is recovered. This material is fractionally distilled to yield 40 parts of product boiling at 99–102° C., $n_D^{25}=1.3901$, and with the characteristic infrared absorption spectrum of pentanone-3. This structure is confirmed by preparing the 2,4-dinitrophenylhydrazone, M.P. 156° C., and making a mixed melting point determination with the 2,4-dinitrophenylhydrazone of authentic pentanone-3. There is no depression in the melting point. There is also obtained 25 parts of product, B.P. 85–91° C./150 mm., which has the characteristic infrared absorption spectrum of propionic acid, and 5 parts of higher boiling organic materials.

Repetition of the above procedure using triphenylstibine in place of pyridine gives similar results.

*Example 4*

The procedure of Example 3 is followed with a charge consisting of 100 parts of water, 1.045 parts of rhodium trichloride trihydrate, and 1.5 parts of pyridine. The reactor is cooled, evacuated, and pressured with a 1:1 carbon monoxide-ethylene mixture. The reactants are heated at 174–200° C. and 500–600 atm. for 1.5 hours. During this period, a pressure drop of 840 atm. is observed. From this reaction there is obtained 200 parts of products consisting of a clear red-brown top phase and a clear colorless bottom phase. The product is distilled through a 12-inch distilling column to yield 182 parts of distillate, boiling range 20–68° C./3.5 mm. and 7 parts of black viscous residue. From the distillate there is separated 116 parts of organic phase which is dried over anhydrous magnesium sulfate and fractionally distilled. From this distillation there is obtained 93 parts of pentanone-3, B.P. 100° C., $n_D^{25}=1.3889$. This structure is confirmed by preparing the 2,4-dinitrophenylhydrazone, M.P. 156° C. There is no depression in a mixed melting point determination with the 2,4-dinitrophenylhydrazone of authentic pentanone-3. There is also obtained 15 parts of 3,6-octanedione which is identified by boiling point (61° C./2 mm.), melting point (34–36° C.), and by elemental analysis (percent C=67.28, percent H=9.84; empirical formula $C_4H_7O$).

Repetition of the above procedure substituting triphenylphosphine and quinoline, respectively, for the pyridine yields similar results.

Example 5

A pressure reactor is charged with 100 parts of water, 2 parts of a one molar solution of palladous chloride in 12 N hydrochloric acid and 7 parts of pyridine. The reactor is cooled, evacuated, and pressured with a 1:1 carbon monoxide-ethylene mixture. The reactants are heated at 250° C. and 1000 atm. pressure for 10 hours, during which period a pressure drop of 935 atm. is observed. There is removed from the reactor 162 parts of two-phase liquid which is distilled through a 12-inch distilling column to give 133.5 parts of two-phase distillate, boiling range 20–46° C./3 mm., and 21 parts of nonvolatile viscous residue. The distillate is washed with calcium chloride, the organic phase is separated, dried over anhydrous magnesium sulfate, and then fractionally distilled. There is thus isolated 28 parts of pentanone-3, B.P. 99–105° C., $n_D^{25}=1.3905$, whose 2,4-dinitrophenylhydrazone melts at 156° C. Its mixed melting point with the 2,4-dinitrophenylhydrazone of authentic pentanone-3 is 156° C. From this distillation there is also obtained 7 parts of higher boiling aldehydes and alcohols, as identified by infrared analysis.

Repetition of the above procedure using tricyclohexylamine in place of pyridine gives similar results.

Example 6

A pressure vessel is charged with 100 parts of water, 0.5 part of iridium trichloride trihydrate, and 1.5 parts of pyridine. The reactor is cooled, evacuated, and pressured with a 1:1 carbon monoxide-ethylene mixture. The reactants are heated at 250° C. and 1000 atm. for 10 hours, during which time a pressure drop of 635 atm. is observed. There is recovered from the reactor 108 parts of two-phase liquid consisting of a clear brown top phase and a clear colorless bottom phase. This material is distilled through a 12-inch distilling column to yield 96 parts of clear colorless two-phase distillate and 7 parts of sticky residue. Sodium chloride is added and the organic phase is separated and fractionally distilled. From this distillation there is obtained 18 parts of pentanone-3, B.P. 100–102° C., $n_D^{25}=1.3905$, identified by its infrared absorption spectrum.

Repetition of the above procedure using triphenylarsine in place of pyridine gives similar results.

Example 7

A pressure reactor is charged with 100 parts of water and one part of the commercial mixture of ruthenium chlorides of Example 3. The reactor is cooled, evacuated, and pressured with a 1:1 carbon monoxide-ethylene mixture. The reactants are heated at 160–180° C./500–600 atm. for 10 hours, during which period a pressure drop in excess of 1040 atm. is observed. There is removed from the reactor 203 parts of two-phase liquid consisting of a dark red-brown top phase and clear colorless bottom phase. This two-phase liquid is distilled through a 12-inch distilling column to yield 179 parts of two-phase distillate, boiling range 30–76° C./3 mm. The aqueous phase is saturated with sodium chloride and 125 parts of organic phase, $n_D^{25}=1.3982$, is separated. A residue of 10 parts of tar is also obtained. The organic phase is again fractionally distilled to yield 80 parts of pentanone-3, B.P. 100–102° C., $n_D^{25}=1.3903$, identified by its infrared absorption spectrum. There is also obtained 18 parts of propionic acid, identified by infrared analysis, and 15 parts of higher boiling carbonyl compounds.

Example 8

A pressure reactor is charged with 100 parts of water and 0.8 part of the commercial mixture of ruthenium chlorides of Example 3. The reactor is cooled, evacuated, and pressured with a 1:1 carbon monoxide-ethylene mixture. The reactants are heated at 188–196° C. and 750–1000 atm. for 10 hours, during which time a pressure drop of 1425 atm. is observed. There is obtained 173 parts of a two-phase product, the top phase being clear deep red in color, and the bottom phase clear and colorless. The two-phase product is distilled through a 12-inch distilling column to yield 157 parts of two-phase distillate, boiling range 25–76° C./2 mm. The distillate is saturated with sodium chloride and 113 parts of organic phase is separated. This material has a refractive index of 1.3939. It is dried over anhydrous magnesium sulfate and fractionally distilled to yield 80 parts of pentanone-3, B.P. 100–102° C., $n_D^{25}=1.3900$, and 20 parts of higher boiling carbonyl-containing compounds.

Example 9

A pressure reactor is charged with 100 parts of water, 1.045 parts of rhodium trichloride trihydrate, and 1.5 parts of pyridine. The reactor is cooled, evacuated, and pressured with a 1:1 carbon monoxide-ethylene mixture. The reactants are heated at 100–190° C. under 100–200 atm. pressure for 10 hours, during which period a pressure drop somewhat in excess of 10 atm. is observed. There is obtained 116 parts of two-phase liquid which is distilled rapidly through a 12-inch distilling column to yield 111 parts of clear colorless two-phase distillate, boiling range 20–30° C./3 mm. The distillate is separated and dried over anhydrous magnesium sulfate. The product is fractionally distilled to yield 18 parts of pentanone-3, B.P. 98–110° C., $n_D^{25}=1.3895$, identified by its infrared absorption spectrum.

The above procedure is repeated using triethylbismuthine in place of pyridine with similar results.

Pentanone-3 is a valuable chemical which finds wide application as a solvent and diluent in the formulation of lacquers based on cellulose derivatives, plastics, and the like.

The process of this invention in employing water as the hydrogen donor in the synthesis of pentanone-3 differs from previously known methods which use hydrogen in the initial charge. It is economical and efficient, and therefore represents a step forward in the synthesis of this valuable chemical.

The foregoing detailed description has been given for clearness of understanding only and no unnecessary limitations are to be understood therefrom. The invention is not limited to the exact details shown and described, for obvious modifications will occur to those skilled in the art.

This application is a continuation-in-part of my earlier application Serial No. 712,303, filed January 31, 1958 now abandoned.

The embodiments of the invention in which an exclusive property or privilege is claimed are defined as follows:

I claim:

1. A process for preparing pentanone-3 comprising contacting reactants consisting essentially of ethylene, carbon monoxide and water at a temperature above 100° C. and a pressure above 100 atmospheres in the presence of a catalyst consisting essentially of at least one halide of a group VIII noble metal of atomic number 44–78, said halide being selected from the class consisting of bromides, chlorides and iodides and said catalyst being present in an amount of at least 0.00001 mole per mole of ethylene.

2. The process of claim 1 wherein the temperature is in the range of 150–300° C., the pressure is at least 200 atmospheres and said halide is a chloride.

References Cited in the file of this patent

UNITED STATES PATENTS

| | | |
|---|---|---|
| 2,593,440 | Hagemeyer | Apr. 22, 1952 |
| 2,839,580 | Hughes et al. | June 17, 1958 |